United States Patent [19]

Grudno

[11] 4,323,344
[45] Apr. 6, 1982

[54] APPARATUS FOR HEAT TREATING FINE-GRAIN MATERIAL

[75] Inventor: Hans-Dieter Grudno, Beckum, Fed. Rep. of Germany

[73] Assignee: Krupp Polysius AG, Fed. Rep. of Germany

[21] Appl. No.: 192,452

[22] Filed: Sep. 30, 1980

[30] Foreign Application Priority Data

Oct. 8, 1979 [DE] Fed. Rep. of Germany ....... 2940676

[51] Int. Cl.³ .............................................. F27B 7/02
[52] U.S. Cl. .................................... 432/106; 432/117
[58] Field of Search ................. 432/106, 117; 106/100

[56] References Cited

U.S. PATENT DOCUMENTS 4,120,645  10/1978  Heian et al. ......................... 432/106
4,201,546   5/1980  Herchenbach et al. ............ 432/106

Primary Examiner—John J. Camby
Attorney, Agent, or Firm—Learman & McCulloch

[57] ABSTRACT

Apparatus for heat treating fine-grain material, in particular in the production of cement, having a kiln from which waste gases are directed by a fan to a preheater for such material and then to dedusters via a main conduit and a bypass conduit. Between one of the dedusters and the pressure side of the fan extends a connecting conduit. Kiln gases selectively may be admitted to or blocked from the connecting conduit when desired.

6 Claims, 1 Drawing Figure

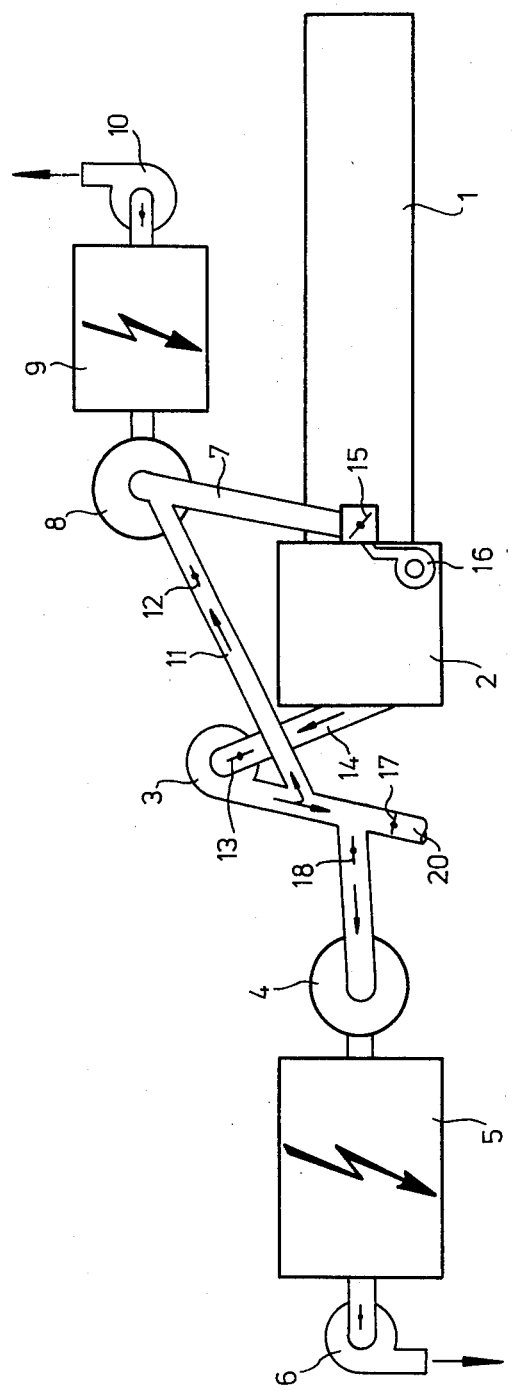

APPARATUS FOR HEAT TREATING FINE-GRAIN MATERIAL

BACKGROUND OF THE INVENTION

The invention relates to an apparatus for heat treating fine-grain material, in particular for the production of cement, comprising a rotary kiln, a preheater, a kiln waste gas fan, and electrofilter serving to remove dust from the kiln waste gases, and a bypass system comprising a bypass conduit connected between the rotary kiln and preheater and an apparatus section serving to dedust the bypass flow.

Apparatuses of this type (see "Zement-Kalk-Gips", 1962, page 203, FIG. 11) are used when the raw material has such a high content of noxious constituents (e.g. alkalis) that by circulation of these noxious substances within the apparatus an inadmissibly high concentration of noxious substances could arise. By branching off a part of the kiln exhaust or waste gases and separate dedusting of said bypass flow (the dust separating from the bypass flow not being returned to the system) the formation of a troublesome circulation of noxious substances (for example alkali circulation) can be avoided.

In the known apparatuses, the bypass system generally comprises either an electrofilter and a preceding cooler or a cyclone for dedusting the bypass flow. The kiln waste-gases conveyed via the waste gas fan generally are supplied to a raw meal grinding apparatus and thereafter dedusted by an electrofilter. When the mill is not operating the kiln waste gases can also be supplied directly to the electrofilter after the necessary cooling.

The bypass system necessary to reduce the concentration of noxious substances involves a considerable expenditure on apparatus. This expenditure is undesirable, particularly in cases in which high contents of noxious substances in the raw material requiring the bypass system to be switched on occur for only short times and only at relatively long intervals.

SUMMARY OF THE INVENTION

The invention has for its objective the provision of apparatus of the type mentioned and in which the expenditure required for a necessary bypass system is considerably reduced.

This objective is achieved according to the invention in that the pressure side of the kiln waste gas fan is connected to the bypass system via a connecting conduit provided with a throttling means.

This provides the possibility, when the bypass system is not required (i.e. when processing raw material with low content of noxious substances), of incorporating the essential parts of the bypass system, in particular an electrofilter provided in the bypass system and preceding cooler or a dedusting cyclone, into the production cycle in that a part of the total kiln waste gases is supplied via the said connection conduit to the aforementioned parts of the bypass system. Thus, the kiln waste gas conveyed by the kiln waste gas fan is divided into a volume flow supplied to the raw meal mill (and the following electrofilter) and a volume flow conducted to the bypass system. Since the kiln waste gas fan is generally provided in any case with a certain power reserve, the apparatus can be driven in such a case with increased waste gas quantity and thus with increased performance. In this manner considerable economic advantages can be achieved particularly in cases in which contents of noxious substances in the raw material high enough to require operation of the bypass system occur only for short times and at relatively long intervals.

According to the invention the capacity or power of the kiln waste gas fan is capable of satisfying the waste gas requirements of the electrofilter plus the full bypass system. In such a case the complete capacity of the bypass system can then be utilized to increase output.

DESCRIPTION OF THE DRAWING

An embodiment of the invention is illustrated in the drawing which is a diagrammatic, plan view of the apparatus.

DETAILED DESCRIPTION

The apparatus illustrated comprises a rotary kiln 1, a preheater 2, a furnace waste gas fan 3, a first evaporation cooler 4, a first electrofilter 5 and a first filter fan 6. The aforementioned apparatus parts lie in the flow path of the kiln waste gases, and the latter can be supplied either via a waste gas conduit 20 firstly to a raw meal mill (not illustrated in the drawing) or directly to the electrofilter 5.

The apparatus further comprises a bypass system comprising a bypass conduit 7 connected between the rotary kiln 1 and preheater 2, a second evaporation cooler 8, a second electrofilter 9 and a second filter fan 10.

The pressure side of the kiln waste gas fan 3 is connected via a connecting conduit 11 to the bypass system, this connecting conduit 11 being connected to the bypass conduit 7 near the connection thereof to the evaporation cooler 8.

Provided in the connecting line 11 is a throttling means 12. A further throttling means 13 is provided in the conduit 14 leading from the preheater 2 to the waste gas fan 3. Disposed in the bypass conduit 7 is a valve 15. A cooling air fan 16 serves to supply fresh air by which the hot kiln gases of the bypass flow extracted at the furnace inlet are cooled to a suitable temperature. Throttling means 17 and 18 serve solely for setting the kiln waste gas quantity supplied to the raw meal mill or directly to the electrofilter 5.

The mode of operation of the apparatus in the two possible cases is as follows:

If a raw material with high content of noxious substances is used so that to reduce the concentration thereof part of the kiln waste gases must be extracted via the bypass system, the valve 15 is opened and the throttling means 12 in the connecting line 11 closed thereby disabling the flow of gases through the conduit 11. Consequently, a definite proportion of the kiln waste gases (for example 10%), depending on the design of the apparatus and the adjustment of the throttling means 13, contained in the kiln waste gas conduit 14 is extracted via the bypass system and dedusted in the electrofilter 9. The dust precipitating in the filter 9 is not returned into the system. The remaining proportion of the waste gases (possibly after previous utilization of the heat content in the raw meal mill not illustrated) is dedusted in the electrofilter 5. This dust proportion is generally returned to the kiln system by suitable, known means.

If on the other hand a raw material is processed whose content of noxious substances is not high enough to require branching off of a bypass flow, the valve 15 is closed and the throttling means 12 in the connecting line 11 opened, thereby enabling gas flow therethrough.

A part of the kiln waste gases conveyed by the fan 3 passes in this case via the connecting line 11 and the evaporation cooler 8 to the electrofilter 9, the dust accumulating here also being returned to the kiln system in known manner. Corresponding to the power reserve of the waste gas fan 3, in this case the system can be driven with a greater amount of waste gas and thus increased performance.

The disclosure is representative of the preferred embodiment of the invention and is intended to be illustrative rather than definitive thereof. The invention is defined in the claims.

What is claimed is:

1. In apparatus for heat treating fine-grain material having a rotary kiln, a preheater for such material communicating with said kiln, a kiln waste gas fan for delivering waste gases from said kiln to said preheater, first dedusting means for dedusting kiln waste gases, conduit means establishing communication between said preheater and said first dedusting means, second dedusting means for dedusting kiln waste gases, and a bypass conduit establishing communication between said preheater and said second dedusting means, the improvement comprising a connecting conduit establishing communication between said second dedusting means and said fan at its pressure side, adjustable throttling means in said connecting conduit for enabling and disabling the flow of kiln waste gases therethrough, and adjustable valve means in said bypass conduit for enabling and disabling the flow of kiln waste gases therethrough.

2. Apparatus according to claim 1 wherein said first dedusting means comprises an electrofilter.

3. Apparatus according to claim 1 wherein said second dedusting means comprises an electrofilter.

4. Apparatus according to claim 1 wherein said fan has a capacity sufficient to satisfy the waste gas requirements of said first dedusting means, said bypass conduit, and said second dedusting means.

5. Apparatus according to claim 1 wherein said throttling means and said valve means are adjustable relatively to one another to enable the flow of said gases through said bypass conduit when the flow of said gases through said connecting conduit is disabled.

6. Apparatus according to claim 1 wherein said throttling means and said valve means are adjustable relatively to one another to disable the flow of said gases through said bypass conduit when the flow of said gases through said connecting conduit is enabled.

* * * * *